L. WOLFF.
RESILIENT ATTACHMENT FOR BICYCLES.
APPLICATION FILED DEC. 2, 1921.
1,432,376. Patented Oct. 17, 1922.
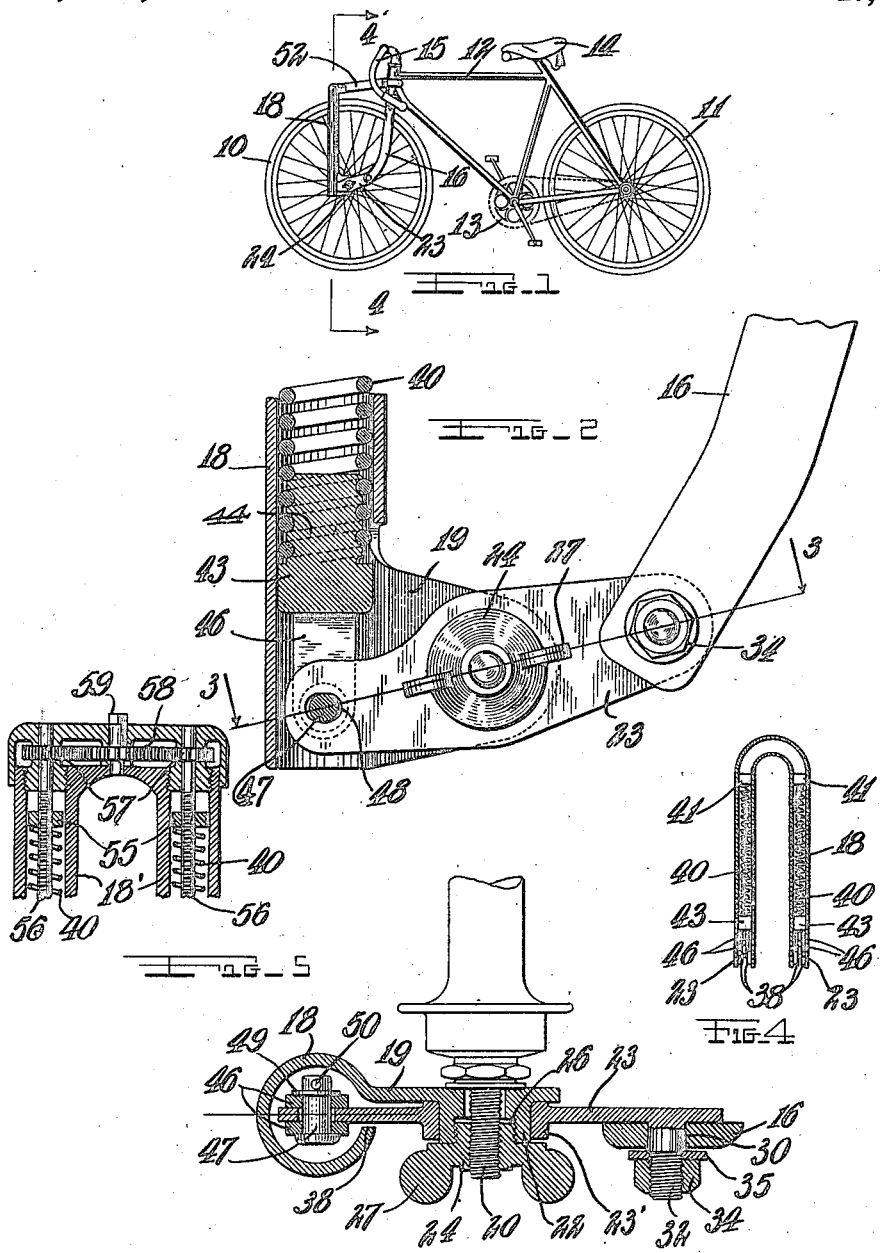
Inventor
Louis Wolff Patented Oct. 17, 1922.

1,432,376

UNITED STATES PATENT OFFICE.

LOUIS WOLFF, OF NEW YORK, N. Y.

RESILIENT ATTACHMENT FOR BICYCLES.

Application filed December 2, 1921. Serial No. 519,351.

*To all whom it may concern:*

Be it known that I, LOUIS WOLFF, citizen of the United States, residing at New York, in the county of New York and State of New York, have invented certain new and useful Improvements in Resilient Attachments for Bicycles, of which the following is a specification.

This invention relates generally to bicycles, having more particular reference to the forming of a resilient connection between the front wheel of the bicycle and the frame.

The invention has for a general object to provide a cushioning means which will absorb shocks and prevent them being transmitted to the arms and body of the rider.

More specifically speaking the invention has for an object to provide a novel and improved connection between the front wheel and the front forks of the bicycle whereby the frame is resiliently supported on the front wheel.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a bicycle having the invention applied thereto.

Fig. 2 is an enlarged fragmentary longitudinal elevation, with certain parts in vertical section, of my improved attachment showing a portion of one of the steering forks connected thereto.

Fig. 3 is a horizontal section on the line 3—3 of Fig. 2, showing the wheel hub and axle end in elevation.

Fig. 4 is a detail transverse vertical sectional view taken along the line 4—4 of Fig. 1 but with the bicycle wheel omitted.

Fig. 5 is a detail vertical sectional view showing a modified form of spring holder provided with means for adjusting the spring.

In Fig. 1 of the drawings, I have shown my invention applied as an attachment to a bicycle of ordinary construction, having front and rear wheels 10 and 11, a diamond shaped frame 12, propelling means 13, seat 14, handle bars 15 and steering forks 16.

As here embodied my improved attachment comprises a vertically disposed tubular yoke 18 of inverted U-shape which straddles the front wheel 10. Formed on each end of the yoke 18 is a rearwardly projecting ear 19 which takes over the usual screw-threaded end 20 of the front axle, the ear 19 having a perforation through which the axle end projects freely.

Formed on the outer face of each ear 19, concentric to the axle opening therein, is a hollow boss 22 which serves as a fulcrum pin for a short vertically movable lever 23 engaging said boss between its ends. To hold the yoke 18 in place on the axle end 20, and the lever 23 in place on the yoke, a double nut 24 is screwed on the threaded axle end and bears on the end of the boss 22, overlapping the latter at its edges so as to project across the hub flange 23' of the lever. This nut 24 is formed with a central exteriorly screw-threaded projection 26 which engages in the screw-threaded recess in the boss. The nuts 24 may be provided with wings 27 for turning purposes.

As will be understood, there are a pair of these levers 23 and they are pivotally connected at their rear ends to the lower ends of the steering forks 16, preferably in the manner shown in detail in Fig. 3. As there shown a boss 30 is formed on the end of the lever and projects through the usual aperture in the lower end of the steering fork, this boss having a rigid projecting screw 32 on which a nut 34 and washer 35 are placed, the washer bearing against the end of the boss 30.

The front end of each lever projects into the lower end of the tubular yoke 18, the latter having a vertical slot such as 38 through which the lever extends. Located in each leg of the yoke 18 is a coiled expansion spring 40 which bears downwardly on the lever 23, the upper ends of the springs bearing against abutment blocks 41 fixed in the legs of the yoke adjacent the upper end of the latter. The space between the two blocks 41, which I have shown as empty in Fig. 4 may be filled in, or the yoke might be made from a solid bar having sockets for the springs drilled in its opposite ends.

The lower ends of the springs 40 preferably do not bear directly on the ends of the levers 23, each leg of the yoke having a head 43 slidable therein each head 43 having a diminished upper portion 44 projecting into the lower end of the spring 40 and formed with a helical peripheral groove in which the lowermost coils of the spring are received. Projecting downwardly from the head 43 is a pair of integral legs 46 which straddle the ends of the lever 23, a headed pin 47 passing through suitable apertures in the lower ends of these legs and through a short longitudinal slot 48 in the lever, a washer 49 and cotter pin 50 holding the pin 47 in place. The slot 48, as will be understood allows the head 43 to travel in a straight vertical line while the lever end moves in an arcuate path. To hold the yoke 18 in upright position a bracing bar 52 connects the top thereof with the front of frame 12, this bar having a pivotal connection with the yoke and frame.

It will be apparent that the invention can be applied to any bicycle of ordinary construction, the steering forks being disengaged from the front axle and the device mounted on the latter, the steering forks being then connected to the rear ends of levers 23. The parts are so arranged as to cause the crotch of the steering forks to be raised slightly when the device is in place, which in conjunction with the rearward adjustment of the forks, allows the latter sufficient play above the wheel.

With my improved device shocks due to roughness in the road are absorbed and are not transmitted to the arms and body of the rider.

In the modification shown in Fig. 5 the fixed abutment blocks 41 are replaced by movable blocks 55 which are threaded on screw-shafts 56 projecting downward into the legs of the yoke 18′. These screw-shafts have gears 57 thereon which mesh with a central gear 58 carried in the head of the yoke this central gear being fixed on a stub-shaft 59 having a squared end projecting upwardly from the yoke. By applying a suitable tool to the end of shaft 59 and rotating the latter, the blocks 55 are adjusted vertically in the yoke and the compression of the springs 40 varied, which may be desired when persons of considerable difference in weight use the bicycle.

Having thus described my invention what I claim as new and desire to protect by Letters Patent of the United States is as follows:

1. In a bicycle, in combination with the front wheel and steering forks thereof, a yoke of inverted U-form fixed at its ends to the wheel axle, a pair of levers fulcrumed on said yoke between their ends, said levers being connected to the steering forks at their rear ends, and springs in the legs of said yokes bearing on the front ends of said levers.

2. In a bicycle, in combination with the front wheel and steering forks thereof, a tubular yoke of inverted U-form having ears formed on its ends and engaging the wheel axle, hollow bosses formed on said ears concentric to the said axle, levers fulcrumed between their ends to said hollow bosses and being connected at their rear ends to the said steering forks, and springs in said tubular yoke bearing on the opposite ends of said levers.

3. In a bicycle, in combination with the front wheel and steering forks thereof, a tubular yoke of inverted U-form having ears formed on its ends and engaging the wheel axle, hollow bosses formed on said ears concentric to said axle, levers fulcrumed between their ends to said bosses and having their rear ends connected to the said steering forks, the front ends of said levers projecting through slots in said yoke into the lower ends of the latter, heads slidable in said yoke and having slot and pin connections with the said levers, and springs bearing on said head.

4. In a bicycle, in combination with the front wheel and steering forks thereof, a tubular yoke of inverted U-form having ears formed on its ends and engaging the wheel axle, hollow bosses formed on said ears concentric to said axle, levers fulcrumed between their ends to said bosses and having their rear ends connected to the said steering forks, the front ends of said levers projecting through slots in said yoke into the lower ends of the latter, heads slidable in said yoke and having slot and pin connections with the said levers, and springs bearing on said head, abutment members in said yoke on which the upper ends of said springs bear, and means for vertically adjusting said abutment blocks.

5. In a bicycle, in combination with the front wheel and steering forks thereof, a tubular yoke of inverted U-form having ears formed on its ends and engaging the wheel axle, hollow bosses formed on said ears, concentric to said axle, levers fulcrumed between their ends to said bosses and having their rear ends connected to the said steering forks, the front ends of said levers projecting through slots in said yoke into the lower ends of the latter, heads slidable in said yoke and having slot and pin connections with the said levers, and springs bearing on said head, abutment members in said yoke on which the upper ends of said springs bear, and means for vertically adjusting said abutment blocks, said means comprising screw-shafts on which said blocks are threaded.

6. In a bicycle, in combination with the front wheel and steering forks thereof, a tubular yoke of inverted U-form having ears formed on its ends and engaging the wheel axle, hollow bosses formed on said ears, concentric to said axle, levers fulcrumed between their ends to said bosses and having their rear ends connected to the said steering forks, the front ends of said levers projecting through slots in said yoke into the lower ends of the latter, heads slidable in said yoke and having slot and pin connections with the said levers, and springs bearing on said head, abutment members in said yoke on which the upper ends of said springs bear, and means for vertically adjusting said abutment blocks, said means comprising screw-shafts on which said blocks are threaded, a gear fixed on each of said screw-shafts, and a central gear meshing with each of said gears.

In testimony whereof I have affixed my signature.

LOUIS WOLFF.